United States Patent
Gao et al.

(10) Patent No.: US 10,462,511 B2
(45) Date of Patent: Oct. 29, 2019

(54) METHOD, DEVICE AND SYSTEM FOR PRESENTING INFORMATION

(71) Applicant: TENCENT TECHNOLOGY (SHENZHEN) COMPANY LIMITED, Shenzhen, Guangdong (CN)

(72) Inventors: Junzhi Gao, Shenzhen (CN); Bin Zhou, Shenzhen (CN); Ao Peng, Shenzhen (CN); Yiting Zhang, Shenzhen (CN); Suibin Yao, Shenzhen (CN); Hao Hu, Shenzhen (CN); Changwen Yuan, Shenzhen (CN); Xiaokang Yuan, Shenzhen (CN); Xing Li, Shenzhen (CN); Shaolin Bai, Shenzhen (CN); Kunxian Wang, Shenzhen (CN); Quanzhen Jiang, Shenzhen (CN); Jie Qi, Shenzhen (CN)

(73) Assignee: TENCENT TECHNOLOGY (SHENZHEN) COMPANY LIMITED, Guangding P.R., Shenzhen (CN)

(*) Notice: Subject to any disclaimer, the term of this patent is extended or adjusted under 35 U.S.C. 154(b) by 0 days.

(21) Appl. No.: 15/694,596

(22) Filed: Sep. 1, 2017

(65) Prior Publication Data

US 2017/0366834 A1 Dec. 21, 2017

Related U.S. Application Data

(63) Continuation of application No. PCT/CN2016/083416, filed on May 26, 2016.

(30) Foreign Application Priority Data

Nov. 20, 2015 (CN) .......................... 2015 1 0810184

(51) Int. Cl.
*H04N 21/2668* (2011.01)
*H04N 21/258* (2011.01)
(Continued)

(52) U.S. Cl.
CPC ... *H04N 21/2668* (2013.01); *H04N 21/25875* (2013.01); *H04N 21/25891* (2013.01);
(Continued)

(58) Field of Classification Search
CPC ......... H04N 21/2668; H04N 21/25891; H04N 21/44222; H04N 21/812; H04N 21/8133;
(Continued)

(56) References Cited

U.S. PATENT DOCUMENTS

| | | | |
|---|---|---|---|
| 2003/0171990 A1* | 9/2003 | Rao ..................... | G06Q 30/0202 705/14.46 |
| 2004/0054577 A1 | 3/2004 | Inoue et al. | |
| 2016/0205442 A1* | 7/2016 | Yee ........................ | G06Q 30/02 725/34 |

FOREIGN PATENT DOCUMENTS

| CN | 104113768 A | 10/2014 |
|---|---|---|
| CN | 104113785 A | 10/2014 |

(Continued)

OTHER PUBLICATIONS

International Search Report with Translation for International Application No. PCT/CN2016/083416 dated Jul. 26, 2016, 13 pages.
(Continued)

*Primary Examiner* — Kunal Langhnoja
(74) *Attorney, Agent, or Firm* — Sughrue Mion, PLLC

(57) ABSTRACT

Provided are a method, a device and a system for presenting information. The method includes: acquiring at least one preset information presentation time point in a video to be played and a pre-stored presentation information set associated with video content at the information presentation
(Continued)

---

Acquire at least one preset information presentation time point in a video to be played and a pre-stored presentation information set associated with video content at the information presentation time point, where the presentation information set corresponds to the information presentation time point in a one-to-one manner — 101

Select to-be-presented information from the presentation information set corresponding to the information presentation time point based on historical browsing information, to obtain the to-be-presented information corresponding to the information presentation time point — 102

Send the to-be-presented information corresponding to the information presentation time point to a terminal — 103 time point, where the presentation information set corresponds to the information presentation time point in a one-to-one manner; selecting to-be-presented information from the presentation information set corresponding to the information presentation time point based on historical browsing information, to obtain the to-be-presented information corresponding to the information presentation time point; and sending the to-be-presented information corresponding to the information presentation time point to a terminal.

8 Claims, 9 Drawing Sheets

(51) Int. Cl.
*H04N 21/262* (2011.01)
*H04N 21/81* (2011.01)
*H04N 21/845* (2011.01)
*H04N 21/431* (2011.01)
*H04N 21/442* (2011.01)
*H04N 21/4722* (2011.01)
*H04N 21/8547* (2011.01)

(52) U.S. Cl.
CPC ... *H04N 21/26283* (2013.01); *H04N 21/4316* (2013.01); *H04N 21/44222* (2013.01); *H04N 21/4722* (2013.01); *H04N 21/812* (2013.01); *H04N 21/8126* (2013.01); *H04N 21/8133* (2013.01); *H04N 21/8456* (2013.01); *H04N 21/8547* (2013.01)

(58) Field of Classification Search
CPC ........... H04N 21/8547; H04N 21/4722; H04N 21/4316; H04N 21/25875; H04N 21/8456; H04N 21/8126; H04N 21/26283
See application file for complete search history.

(56) References Cited

FOREIGN PATENT DOCUMENTS

| | | |
|---|---|---|
| CN | 104113786 A | 10/2014 |
| CN | 104168491 A | 11/2014 |
| CN | 104754419 A | 7/2015 |
| EP | 2 919 478 A1 | 9/2015 |
| EP | 2 961 172 A1 | 12/2015 |
| JP | H 07-321748 A | 12/1995 |
| JP | 2003-067629 A | 3/2003 |
| JP | 2006-209658 A | 8/2006 |
| JP | 2008-040623 A | 2/2008 |
| KR | 10-0911270 B1 | 8/2009 |
| WO | WO 02/101587 A1 | 12/2002 |

OTHER PUBLICATIONS

Communication dated Dec. 5, 2018, issued by the Korean Intellectual Property Office in corresponding Korean Application No. 10-2017-7036493.
Office Action with Translation Issued for Japanese Application No. 2017-560713 dated Sep. 10, 2018.
Communication dated Apr. 1, 2019 from the State Intellectual Property Office of the P.R.C. in application No. 201510810184.2.
Communication dated May 8, 2019, issued by the Korean Intellectual Property Office in corresponding Korean Application No. 10-2017-7036493.
Written Opinion in International Application No. PCT/CN2016/083416, dated Jul. 26, 2016.

* cited by examiner

METHOD, DEVICE AND SYSTEM FOR PRESENTING INFORMATION

This application is a continuation of International Patent Application No. PCT/CN2016/083416, filed on May 26, 2016, which claims the priority to Chinese Patent Application No. 201510810184.2, titled "METHOD, DEVICE AND SYSTEM FOR PRESENTING INFORMATION" and filed with the State Intellectual Property Office of the People's Republic of China on Nov. 20, 2015, both of which are incorporated herein by reference in their entireties.

FIELD

The present disclosure relates to the field of computer technology, and in particular to a method, a device and a system for presenting information.

BACKGROUND

With the development of computer technology and network technology, network video business has been widely promoted and content of the network video is increasingly abundant, thereby attention of users is attracted by abundant content of the network video. When a user watches a network video by using a terminal, a server of the network video business may push presentation information to the terminal, such as news information, advertising information.

In the conventional art, presentation information with a certain time period is usually set before playing the network video by a technician. That is, when the user uses the terminal to access a video website to watch a video, the user will watch the presentation information with a certain time period before the video is played. Then, the user may access a page including detailed contents of the presentation information by clicking a page including the presentation information.

However, generally, presentation information pushed to different terminals playing different videos by the server of the network video business is the same for a time period, hence the presentation information displayed to every user is the same during this time period. For many users, the presentation information may not meet actual requirements of the user, thereby resulting in low effectiveness of the presenting information.

SUMMARY

To solve the problem in the conventional art, a method, a device and a system for presenting information are provided according to embodiments of the present disclosure. Provided technical solutions are described as follows.

In one aspect, a method for presenting information is provided. The method includes:
acquiring at least one preset information presentation time point in a video to be played and a pre-stored presentation information set associated with video content at the information presentation time point, where the presentation information set corresponds to the information presentation time point in a one-to-one manner;
selecting to-be-presented information from the presentation information set corresponding to the information presentation time point based on historical browsing information, to obtain the to-be-presented information corresponding to the information presentation time point; and
sending the to-be-presented information corresponding to the information presentation time point to a terminal.

In another aspect, a method for presenting information is provided. The method includes:
informing a server of a video to be played on a terminal;
receiving to-be-presented information corresponding to a preset information presentation time point in the video to be played sent from the server; and
playing the video, and displaying the to-be-presented information at the preset information presentation time point corresponding to the to-be-presented information.

In another aspect, a server is provided. The server includes:
an acquiring module, configured to acquire at least one preset information presentation time point in a video to be played and a pre-stored presentation information set associated with video content at the information presentation time point, where the presentation information set corresponds to the information presentation time point in a one-to-one manner;
a selecting module, configured to select to-be-presented information from the presentation information set corresponding to the information presentation time point based on historical browsing information, to obtain the to-be-presented information corresponding to the information presentation time point; and
a sending module, configured to send the to-be-presented information corresponding to the information presentation time point to a terminal.

In another aspect, a terminal is provided. The terminal includes:
an informing module, configured to inform a server of a video to be played on a terminal;
a receiving module, configured to receive to-be-presented information corresponding to a preset information presentation time point in the video to be played sent from the server; and
a presenting module, configured to play the video and display the to-be-presented information at the information presentation time point corresponding to the to-be-presented information.

In another aspect, a system for presenting information is provided. The system includes a server and a terminal, where
the terminal is configured to inform the server of a video to be played on the terminal;
the server is configured to: acquire at least one preset information presentation time point in the video to be played and a pre-stored presentation information set associated with video content at the information presentation time point, where the presentation information set corresponds to the information presentation time point in a one-to-one manner; select to-be-presented information from the presentation information set corresponding to the information presentation time point based on historical browsing information, to obtain the to-be-presented information corresponding to the information presentation time point; and send the to-be-presented information corresponding to the information presentation time point to the terminal, and
the terminal is further configured to: receive the to-be-presented information corresponding to the preset information presentation time point in the video to be played sent from the server; and play the video and display the to-be-presented information at the preset information presentation time point corresponding to the to-be-presented information.

Example beneficial effects of the technical solutions provided in the embodiments of the present disclosure are described as follows.

In the embodiments of the present disclosure, a preset information presentation time point in a video to be played and a pre-stored presentation information set associated with video content at the information presentation time point are acquired, to-be-presented information is selected from the presentation information set corresponding to the information presentation time point based on historical browsing information, to obtain the to-be-presented information corresponding to the information presentation time point, and the to-be-presented information corresponding to the information presentation time point is sent to a terminal, and the terminal displays the to-be-presented information at the information presentation time point corresponding to the to-be-presented information when terminal the plays the video. In this way, when the video is played on the terminal, the presentation information presented to the user is selected based on the historical browsing information, thereby improving the effectiveness of the presentation information.

BRIEF DESCRIPTION OF THE DRAWINGS

The accompanying drawings to be used in the description of the embodiments are described briefly as follows, so that the technical solutions according to the embodiments in the present disclosure become clearer. It is apparent that the accompanying drawings in the following description only illustrate some embodiments of the invention. For those skilled in the art, other drawings may be obtained based on these accompanying drawings and fall within the scope of this disclosure.

DETAILED DESCRIPTION OF EMBODIMENTS

For explaining technical solutions and advantages of the disclosure more clearly, embodiments of the disclosure are further described in detail hereinafter in conjunction with drawings.

A method for presenting information is provided in this embodiment of the present disclosure. The method may be implemented by a server and a terminal together. The server may be a server for pushing presentation information to the terminal in the process of playing a network video, the terminal may be a terminal having a video playing ability used by a user.

Figure 1:
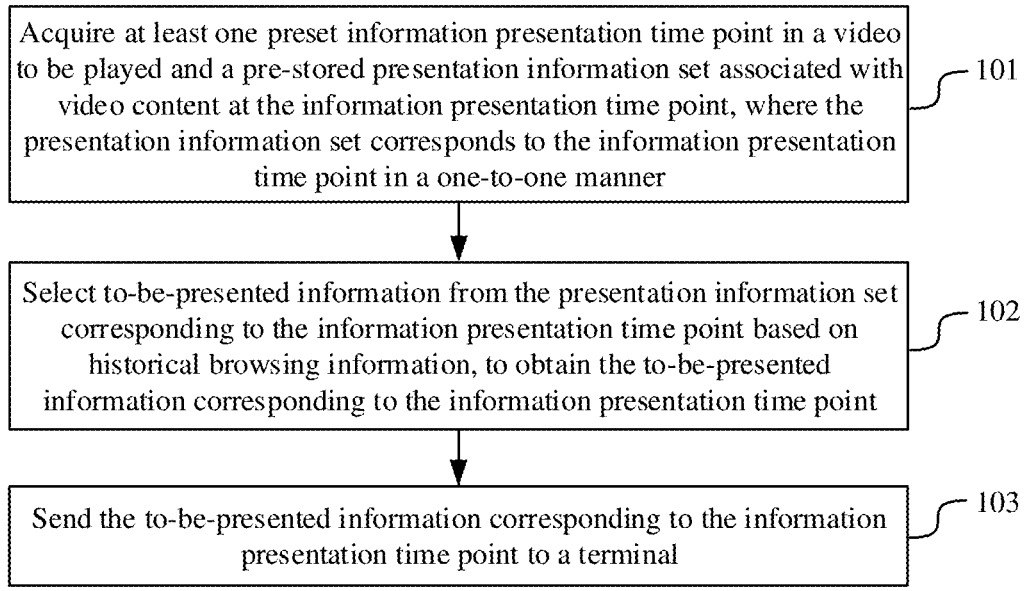
FIG. 1 is a flow chart of a method for presenting information according to an embodiment of the present disclosure.

As shown in FIG. 1, a processing flow of the server in this method may include following steps 101 to 103.

In step 101, at least one preset information presentation time point in a video to be played and a pre-stored presentation information set associated with video content at the information presentation time point are acquired. The presentation information set corresponds to the information presentation time point in a one-to-one manner.

In step 102, to-be-presented information is selected from the presentation information set corresponding to the information presentation time point based on historical browsing information, to obtain the to-be-presented information corresponding to the information presentation time point.

In step 103, the to-be-presented information corresponding to the information presentation time point is sent to a terminal.

Figure 2:
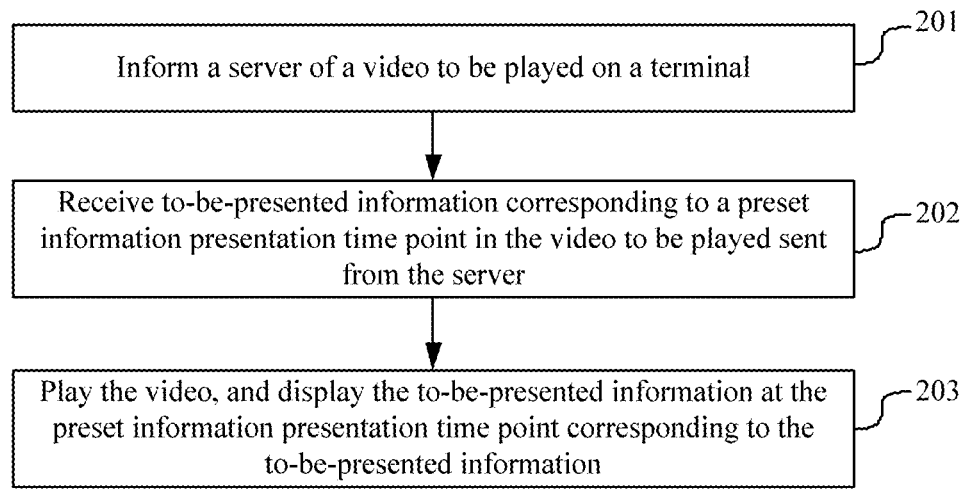
FIG. 2 is a flow chart of a method for presenting information according to an embodiment of the present disclosure.

As shown in FIG. 2, a processing flow of the terminal in this method may include following steps 201 to 203.

In step 201, a server is informed of a video to be played on a terminal.

In step 202, to-be-presented information corresponding to a preset information presentation time point in the video to be played, sent from the server, is received.

In step 203, the video is played, and the to-be-presented information is displayed at the preset information presentation time point corresponding to the to-be-presented information.

In the embodiments of the present disclosure, a preset information presentation time point in a video to be played and a pre-stored presentation information set associated with video content at the information presentation time point are acquired, the presentation information set corresponds to the information presentation time point in a one-to-one manner, to-be-presented information is selected from the presentation information set corresponding to the information presentation time point based on historical browsing information, to obtain the to-be-presented information corresponding to the information presentation time point, and the to-be-presented information corresponding to the information presentation time point is sent to a terminal. In this way, when the video is played on the terminal, the presentation information presented to the user is selected based on the historical browsing information, hence the presentation information presented to the user relatively meets the requirements of the user, thereby improving the effectiveness of the presentation information.

A method for presenting information is provided in this embodiment of the present disclosure, and the method may be implemented by a server and a terminal together. The server may be a server for pushing presentation information to the terminal in the process of playing a network video, the server may also be called as an information presentation server. The terminal may be a terminal having a video playing ability used by a user, the terminal may be installed with an application for playing a video. The information presentation server may also be a server group including multiple servers, the information presentation server may be arranged with a processor, a memory, a transceiver and so on. The processor is configured to process information presentation during a process of pushing the network video, the memory is configured to store data required and data generated during the processing, and the transceiver is configured to receive and send information. The terminal may be arranged with a processor, a memory, a transceiver and so on. The processor is configured to process the information presentation during a process of playing the network video, the memory is configured to store data required and data generated during the processing, and the transceiver is configured to receive and send information. The terminal may also be arranged with an input and output device such as a screen, the screen is configured to display an interface of the application program and a video frame, and the screen may be a touch control screen. The terminal may play a network video through a video application, or by accessing a video website. The presentation information may be news information and advertising information. In this embodiment of the present disclosure, detailed descriptions of the technical solution are made by taking the example of the advertising information for goods being considered as the presentation information, and other cases are similar to the described case, which are not described repeatedly in this embodiment for simplicity.

Figure 3:
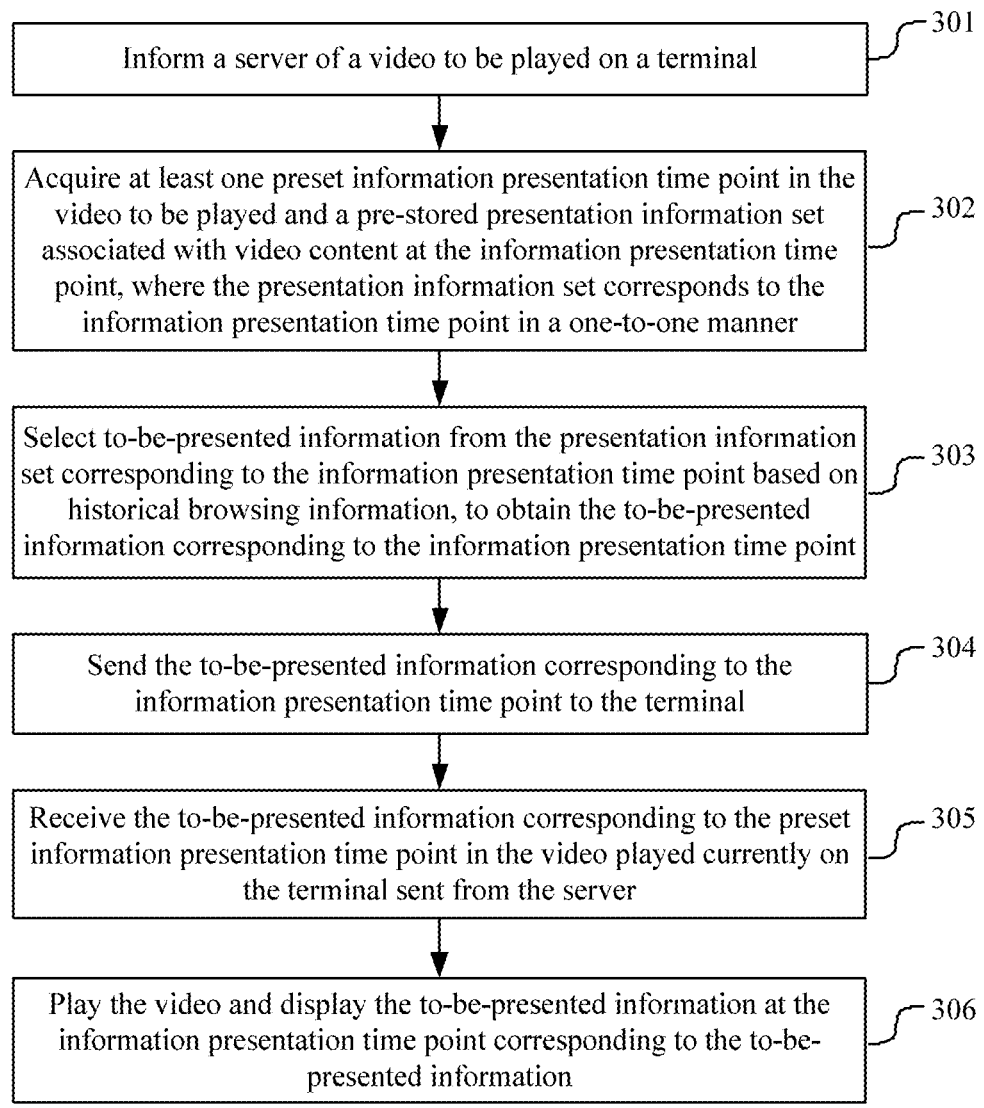
FIG. 3 is a flow chart of a method for presenting information according to an embodiment of the present disclosure.

Processing flow shown in FIG. 3 is further described hereinafter in conjunction with specific implementations.

In step 301, a server is informed of a video to be played on a terminal.

Figure 4:
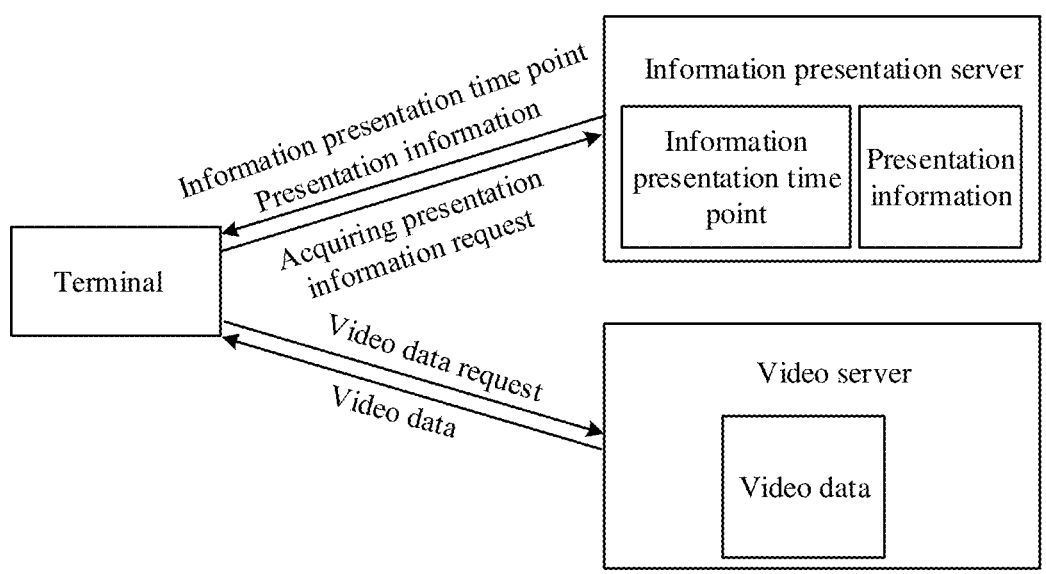
FIG. 4 is a flow chart of a method for presenting information according to an embodiment of the present disclosure.

As shown in FIG. 4, when a user wants to watch a video, the user may start an application for playing the video on the terminal, and select the video in a video list of the application to trigger the terminal to request video data from a video server and send a pre-patch information request to an information presentation server (abbreviated as a server hereinafter), where the pre-patch information request includes a video identifier of the video.

In step 302, at least one preset information presentation time point in the video to be played and a pre-stored presentation information set associated with video content at the information presentation time point are acquire, where the presentation information set corresponds to the information presentation time point in a one-to-one manner.

The information presentation time point may be a time point at which the presentation information is displayed in a video played currently, and may be preset by a technician. Content of the presentation information and the information presentation time point corresponding to the presentation information may be set by the technician. The presentation information may be advertising information, news information and so on. One presentation information set may include all presentation information capable of being presented at one information presentation time point.

In the implementation, for a mass of presentation information, the technician may find a playing time point, at which a playing frame including a commodity is played, in a video based on the commodity to be presented by the presentation information, and regards the playing time point as the information presentation time point corresponding to the presentation information. Therefore, multiple information presentation time points may be obtained for the video, and a correspondence between the video identifier and the information presentation time point may be stored in the server. For any one information presentation time point, the one piece or multiple pieces of presentation information corresponding to the information presentation time point may compose one presentation information set, and a correspondence between the information presentation time point and the presentation information set for the video may be stored in the server. In addition, a technician may preset an interpolation time point, and store a correspondence between the interpolation time point and the video identifier in the server. During the process of playing the video, the video is stopped being played and interpolation information is played at the interpolation time point, the video is continued to be played after the interpolation information is played.

Referring to FIG. 4 again, after the server receives the pre-patch information request, the server sends acquired pre-patch information (e.g., the presentation information before playing the video) to the terminal. Then the server searches every information presentation time point for the video from the correspondence between the video identifier and the information presentation time point and every interpolation time point for the video from the correspondence between the video identifier and the interpolation time point based on the video identifier, and sends the information presentation time point and the interpolation time point to the terminal. The terminal plays the pre-patch information (a pre-patch advertising for example), and plays the video after the pre-patch information is played completed. After that, if the terminal determines that the information presentation time point is received, the terminal sends an acquiring presentation information request to the server after starting to play the video for a time period, such as 2 seconds. The acquiring presentation information request includes the video identifier and an account identifier of a current login account of the terminal. After receiving the acquiring presentation information request, the server may acquire the presentation information set corresponding to each of all information presentation time points for the video.

In step 303, to-be-presented information is selected from the presentation information set corresponding to the information presentation time point based on historical browsing information, to obtain the to-be-presented information corresponding to the information presentation time point.

In one embodiment, the server may acquire the historical browsing information of the current login account of the terminal to acquire certain attribute information of a commodity browsed by the user for greater number of times. Then, the presentation information (advertising information for example) of a commodity having attribute information identical or similar to the attribute information of the commodity browsed by the user for greater number of times is selected from the presentation information set corresponding to each of the information presentation time points. In this way, for every information presentation time point, corresponding one piece or multiple pieces of to-be-presented information may be selected.

Optionally, the to-be-presented information corresponding to every information presentation time point may also be selected based on a presentation information type having the greatest number of browsing times. A corresponding process includes: determining the number of browsing times of each presentation information type based on the historical browsing information; and selecting presentation information with the presentation information type having the greatest number of browsing times from the presentation information set corresponding to the information presentation time point as the to-be-presented information corresponding to the information presentation time point.

The presentation information type may be a type of the commodity corresponding to the presentation information. And the presentation information type may include multi-level classifications, for example, first level classifications may include costumes, automobiles, furniture and so on, and classifications of costumes may include second level classifications such as tops, trousers, shoes.

In one embodiment, the server may acquire the account identifier in the acquiring presentation information request, and acquire the historical browsing information of the current login account of the terminal based on the account identifier, then acquire the presentation information type of each piece of presentation information browsed by the user in the historical browsing information to determine the number of browsing times of each presentation information type in the historical browsing information. In a process of selecting the to-be-presented information corresponding to the information presentation time point, the presentation information types included in the presentation information set corresponding to the information presentation time point may be acquired, then the number of browsing times of each of the presentation information types is acquired, and the presentation information with the presentation information type having the greatest number of browsing times is selected. The to-be-presented information corresponding to each information presentation time point in the video played currently may be obtained based on the above method.

For example, in a process of selecting the to-be-presented information corresponding to the information presentation time point when the play time reaches 5 minutes, the server may obtain, based on the historical browsing information, that the number of browsing times of lady shorts is 30, the number of browsing times of lady sandals is 15, the number of browsing times of lady glasses is 50, the number of browsing times of men coats is 12 and so on, and the presentation information types in the presentation information set corresponding to the information presentation time point includes lady glasses and men coats. In this case, the presentation information type having the greatest number of browsing times corresponding to the information presentation time point is lady glasses.

Optionally, a priority of the presentation information may be set based on the number of browsing times, and the to-be-presented information may be selected based on the priority. A corresponding process includes: acquiring a preset target number of presenting times and a remaining number of presenting times of each piece of presentation information for the video; determining a priority of each piece of presentation information for the video based on a ratio of the remaining number of presenting times to the preset target number of presenting times of the piece of presentation information; and selecting the piece of presentation information having the highest priority with the presentation information type having the greatest number of browsing times from the presentation information set corresponding to the information presentation time point as the to-be-presented information corresponding to the information presentation time point.

In one embodiment, in a process of selecting the to-be-presented information corresponding to the information presentation time point, the server may acquire the account identifier in the acquiring presentation information request, and acquire the historical browsing information of the current login account of the terminal based on the account identifier, then acquire the presentation information type of each piece of presentation information browsed by the user in the historical browsing information to determine the number of browsing times of each presentation information type in the historical browsing information. In a process of selecting the to-be-presented information corresponding to the information presentation time point, the presentation information types included in the presentation information set corresponding to the information presentation time point may be acquired, then the number of browsing times of each of the presentation information types is acquired, and multiple pieces of presentation information with the presentation information type having the greatest number of browsing times are selected. A ratio of the remaining number of presenting times to the preset target number of presenting times of the selected presentation information is calculated, and the priority of each piece of presentation information is determined. A greater ratio of the remaining number of presenting times to the preset target number of presenting times of the presentation information indicates a higher priority of the presentation information. On the contrary, a less ratio of the remaining number of presenting times to the preset target number of presenting times of the presentation information indicates a lower priority of the presentation information. The piece of presentation information having the highest priority is selected from the selected multiple pieces of presentation information as the to-be-presented information corresponding to the information presentation time point. The to-be-presented information corresponding to each information presentation time point in the video played currently may be obtained based on the above method.

For example, an information presentation time point is preset at the time point when the play time reaches 20 minutes and 5 seconds in the video played currently, and the presentation information types in the presentation information set corresponding to the information presentation time point include laundry detergent and lady short sleeve, and the presentation information type having the greatest number of browsing times in the acquired historical browsing information is lady short sleeve. And there are 3 pieces of presentation information for pink lady short sleeve in the presentation information set corresponding to the information presentation time point, while the priorities of 3 pieces of presentation information for pink lady short sleeve are 0.5, 0.2 and 0.3 respectively. In this case, the presentation information having a priority being 0.5 is selected as the to-be-presented information at the time point when the play time reaches 20 minutes and 5 seconds.

Additionally, in a case that there are multiple pieces of presentation information having the highest same priority in the presentation information with the presentation information type having the greatest number of browsing times, in a process of selecting the presentation information, a commodity price corresponding to the presentation information may be acquired, and the presentation information corresponding to the highest commodity price may be selected as the to-be-presented information.

In one embodiment of the present disclosure, the to-be-presented information corresponding to each information presentation time point may be selected based on account attribute information of a login account of the terminal and the historical browsing information. A corresponding process includes: selecting, based on the historical browsing information and the account attribute information of a current login account of the terminal, presentation information meeting a preset matching condition with the historical browsing information and the account attribute information from the presentation information set corresponding to the information presentation time point as the to-be-presented information corresponding to the information presentation time point.

In a process of selecting the to-be-presented information corresponding to the information presentation time point, the server may acquire the account identifier in the acquiring presentation information request, and acquire the historical browsing information of the current login account of the terminal based on the account identifier, then acquire the presentation information type of each piece of presentation information browsed by the user in the historical browsing information to determine the number of browsing times of each presentation information type in the historical browsing information. In a process of selecting the to-be-presented information corresponding to the information presentation time point, the presentation information types included in the presentation information set corresponding to the information presentation time point may be acquired, then the number of browsing times of each of the presentation information types is acquired, and multiple pieces of presentation information with the presentation information type having the greatest number of browsing times are selected. Then the account attribute information, such as gender, age, education, district, of the current login account may be acquired based on the account identifier of the current login account. The piece of presentation information having account attribute information the same as or similar to the account attribute information of the current login account is selected from the selected multiple pieces of presentation information corresponding to the information presentation time point. In this way, the to-be-presented information corresponding to each information presentation time point may be obtained.

For example, in a process of selecting the to-be-presented information corresponding to the information presentation time point when the play time reaches 41 minutes and 5 seconds, it is determined that the presentation information type having the greatest number of browsing times is men shirt, multiple pieces of presentation information for men shirt are selected from the presentation information set corresponding to the information presentation time point. And it is determined that the account attribute information of the current login account includes gender being man, age being 22 years old and district being Beijing, then presentation information having attributes of gender being man and age being 22 years old may be selected from the selected multiple pieces of presentation information, therefore the to-be-presented information corresponding to the information presentation time point is obtained.

In addition, in a process of selecting the to-be-presented information corresponding to the information presentation time point, the server may acquire the account identifier in the acquiring presentation information request, and acquire the historical browsing information of the current login account of the terminal based on the account identifier, then acquire the presentation information type of each piece of presentation information browsed by the user in the historical browsing information to determine the number of browsing times of each presentation information type in the historical browsing information. In a process of selecting the to-be-presented information corresponding to the information presentation time point, the presentation information types included in the presentation information set corresponding to the information presentation time point may be acquired, then the number of browsing times of each of the presentation information types is acquired, and multiple pieces of presentation information with the presentation information type having the greatest number of browsing times are selected. Then the account attribute information of an account associated with the current login account may be acquired based on the account identifier of the current login account. Based on the account attribute information of the associated account, the piece of presentation information matched with the account attribute information is selected from the selected multiple pieces of presentation information corresponding to the information presentation time point.

In step 304, the to-be-presented information corresponding to the information presentation time point is sent to the terminal.

In one embodiment, after the server determines the to-be-presented information corresponding to each preset information presentation time point in the video played currently on the terminal, the server may send preset all information presentation time points and the to-be-presented information corresponding to each information presentation time point to the terminal after the video is played for a time period. The server also may send the to-be-presented information corresponding to each information presentation time point to the terminal when the video is played to the information presentation time point.

In step 305, the to-be-presented information corresponding to the preset information presentation time point in the video played currently on the terminal, sent from the server, is received.

In the implementation, the terminal may receive each preset information presentation time point in the video played currently and the to-be-presented information corresponding to each preset information presentation time point sent from a server.

In step 306, the video is played, and the to-be-presented information is displayed at the information presentation time point corresponding to the to-be-presented information.

Figure 5:
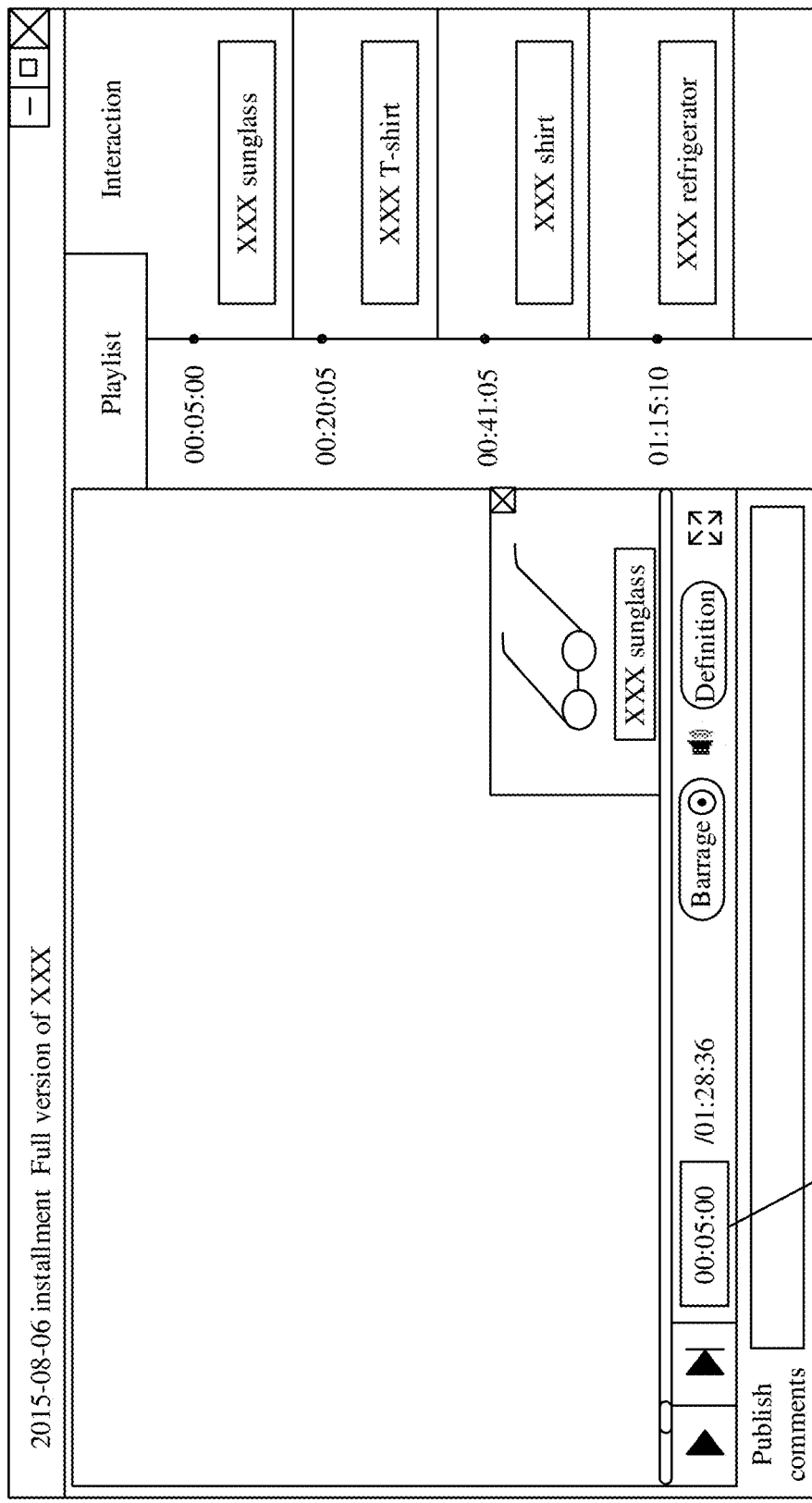
FIG. 5 is a schematic diagram of an interface for presenting information according to an embodiment of the present disclosure.

In the implementation, as shown in FIG. 5, after the terminal receives each preset information presentation time point in the video played currently and corresponding to-be-presented information, time information and the to-be-presented information corresponding to each information presentation time point in the video may be displayed in an information bar in right of a video playing screen (such as "interaction" bar in FIG. 5) in a case that the video is not played in full screen. And when the video is played to the information presentation time point, a preset presentation location point is acquired, for example the lower right corner of the video playing screen, and the to-be-presented information corresponding to the information presentation time point is displayed at the presentation location point on the video playing screen.

In a case that the video is played in full screen, after the terminal receives the to-be-presented information corresponding to the preset information presentation time point in the video played currently, when the video is played to the information presentation time point, a preset presentation location point is acquired, and the to-be-presented information corresponding to the information presentation time point is displayed at the presentation location point on the video playing screen.

In the embodiment of the present disclosure, when displaying the presentation information during playing the video, an associated marker may also be displayed between the presentation information and a relevant commodity in the video frame. Specifically, the server may execute following steps: determining an associated location corresponding to the to-be-presented information corresponding to the information presentation time point in the video according to a pre-stored correspondence between presentation information for the video and an associated location in the video; and sending the to-be-presented information corresponding to the information presentation time point and the associated location corresponding to the to-be-presented information to the terminal.

In one embodiment, the correspondence between the to-be-presented information and the associated location in the video may be preset. Specifically, firstly the presentation information set corresponding to each information presentation time point in the video may be acquired, and a commodity to be displayed by each piece of presentation information in the presentation information set is determined; then an associated location (a coordinate point of a commodity for example) of the commodity to be displayed by each piece of presentation information in an image frame corresponding to the information presentation time point in the video is determined; and the correspondence between each piece of presentation information and an associated location in the video is stored to the server. Optionally, a technician may acquire the presentation information type included in the presentation information set corresponding to each information presentation time point, and determine the associated location (a coordinate point of a commodity for example) of the commodity corresponding to the presentation information type in the video, thus a correspondence between the presentation information type and the associated location in the video is established. In one presentation information set, one presentation information type corresponds to multiple pieces of presentation information, and a correspondence between each piece of presentation information and the associated location in the video is established.

After determining the to-be-presented information corresponding to each information presentation time point, the server may acquire the pre-stored correspondence between the to-be-presented information for the video and the associated location in the video based on the to-be-presented information corresponding to the information presentation time point; and acquire the associated location in the video corresponding to the to-be-presented information corresponding to the information presentation time point based on the correspondence; then send the to-be-presented information corresponding to each information presentation time point in the video and the associated location in the video corresponding to the to-be-presented information to the terminal.

In correspondence to the above process of the server, a process performed by the terminal includes: receiving the to-be-presented information corresponding to the preset information presentation time point in the video to be played and an associated location corresponding to the to-be-presented information sent from the server; and playing the video, and displaying the to-be-presented information at the information presentation time point corresponding to the to-be-presented information, and displaying an associated marker between the to-be-presented information and the associated location in the video.

Figure 6:
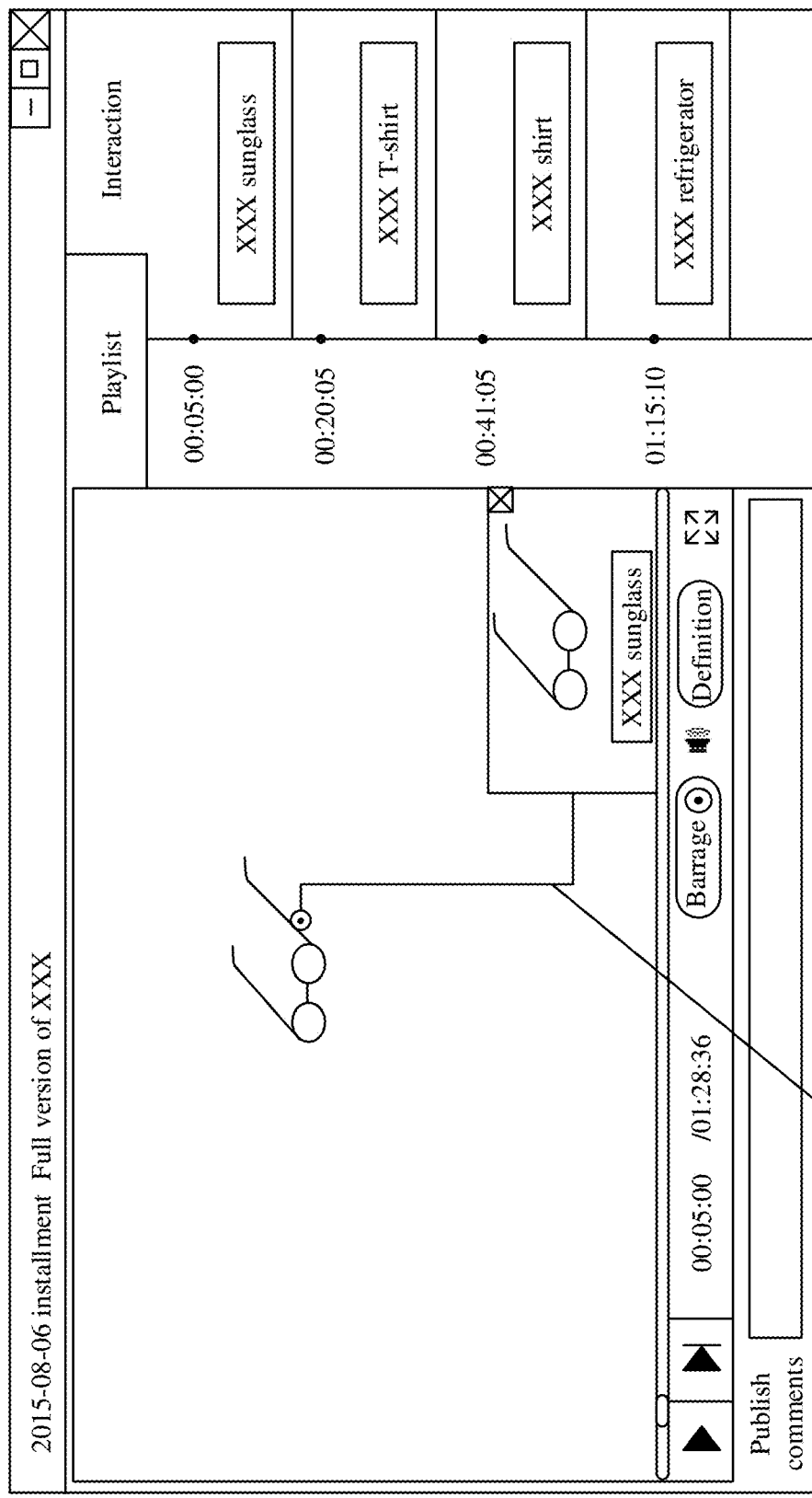
FIG. 6 is a schematic diagram of an interface for presenting information according to an embodiment of the present disclosure.

In one embodiment, as shown in FIG. 6, the terminal receives the to-be-presented information corresponding to each preset information presentation time point in the video played currently and the associated location corresponding to the to-be-presented information.

When the video is played to the information presentation time point, a preset presentation location point is acquired, for example the lower right corner of the video playing screen. Then the to-be-presented information is displayed at the presentation location point, and an associated marker is displayed between the to-be-presented information and the corresponding associated location in the video (e.g., the location of the commodity displayed by the to-be-presented information in the video frame). For example, presentation information for a sunglass is preset at the time point when the play time of the video played currently reaches 5 minutes, then when the video is played to a time point when the play time reaches 5 minutes, the presentation information for the sunglass is displayed at the lower right corner of the video playing screen, and a connecting line (e.g., the associated marker) is displayed in the video playing screen to connect the presentation information for the sunglass with the sunglass in the video playing screen.

In the embodiment of the present disclosure, the to-be-presented information corresponding to each information presentation time point may also be selected directly based on the priority of the presentation information. A corresponding process is described as follows.

After the server acquires the presentation information set associated with video content at each information presentation time point, a preset target number of presenting times and a remaining number of presenting times of each piece of presentation information in the presentation information set may be acquired, and a ratio of the remaining number of presenting times to the preset target number of presenting times of the piece of presentation information is calculated. A greater ratio of the remaining number of presenting times to the preset target number of presenting times of the presentation information indicates a higher priority of the presentation information. On the contrary, a less ratio of the remaining number of presenting times to the preset target number of presenting times of the presentation information indicates a lower priority of the presentation information. In a process of selecting the to-be-presented information corresponding to the information presentation time point in the video played currently, the presentation information having the highest priority may be selected from the presentation information set corresponding to each information presentation time point based on the priority of each piece of presentation information. If there are multiple pieces of presentation information having the same priority in the presentation information set, when selecting the to-be-presented information, the presentation information corresponding to a commodity with a highest price may be selected from the presentation information set corresponding to each information presentation time point, based on a commodity price corresponding to presentation information.

In the embodiments of the present disclosure, a preset information presentation time point in a video played currently on the terminal and a pre-stored presentation information set associated with video content at the information presentation time point are acquired, to-be-presented information is selected from the presentation information set corresponding to the information presentation time point based on historical browsing information, to obtain the to-be-presented information corresponding to the information presentation time point, and the to-be-presented information corresponding to the information presentation time point is sent to a terminal. In this way, when the video is played on the terminal, the presentation information presented to the user is selected based on the historical browsing information, hence the presentation information presented to the user meets the requirements of the user, thereby improving the effectiveness of the presentation information.

Figure 7:
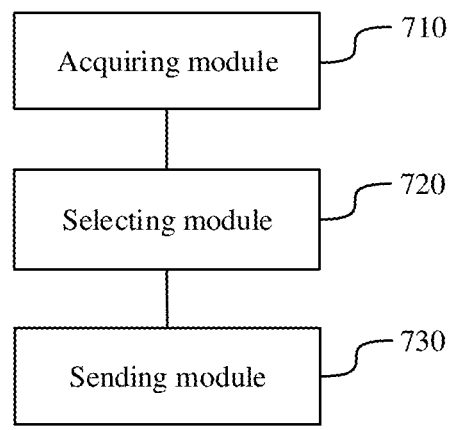
FIG. 7 is a schematic structural diagram of a device for presenting information according to an embodiment of the present disclosure.

Based on the same technical concept, the embodiment of the present disclosure also provides a server as shown in FIG. 7. The server includes an acquiring module 710, a selecting module 720 and a sending module 730.

The acquiring module 710 is configured to acquire at least one preset information presentation time point in a video to be played and a pre-stored presentation information set associated with video content at the information presentation time point, where the presentation information set corresponds to the information presentation time point in a one-to-one manner.

The selecting module 720 is configured to select to-be-presented information from the presentation information set corresponding to the information presentation time point based on historical browsing information, to obtain the to-be-presented information corresponding to the information presentation time point.

The sending module 730 is configured to send the to-be-presented information corresponding to the information presentation time point to a terminal.

Optionally, the acquiring module 710 is further configured to determine an associated location corresponding to the to-be-presented information corresponding to the information presentation time point in the video according to a pre-stored correspondence between presentation information for the video and an associated location in the video.

The sending module 730 is configured to send the to-be-presented information corresponding to the information presentation time point and the associated location corresponding to the to-be-presented information to the terminal.

Optionally, the selecting module 720 is configured to: select, based on historical browsing information and account attribute information of a current login account of the terminal, presentation information meeting a preset matching condition with the historical browsing information and the account attribute information from the presentation information set corresponding to the information presentation time point as the to-be-presented information corresponding to the information presentation time point.

Figure 8:
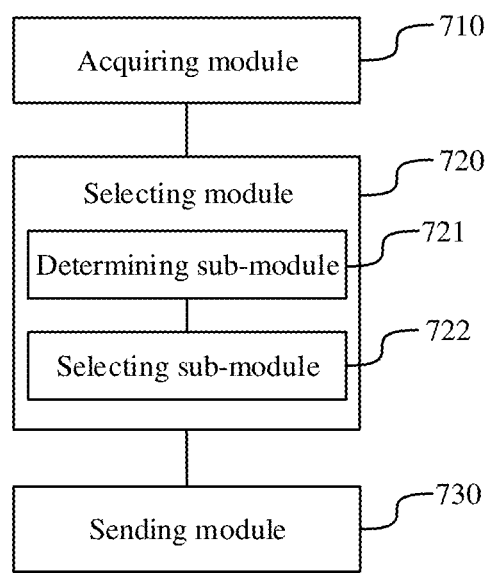
FIG. 8 is a schematic structural diagram of a device for presenting information according to an embodiment of the present disclosure.

Optionally, as shown in FIG. 8, the selecting module 720 includes: a determining sub-module 721 and a selecting sub-module 722.

The determining sub-module 721 is configured to determine the number of browsing times of each presentation information type based on the historical browsing information.

The selecting sub-module 722 is configured to select presentation information with the presentation information type having the greatest number of browsing times from the presentation information set corresponding to the information presentation time point as the to-be-presented information corresponding to the information presentation time point.

Figure 9:
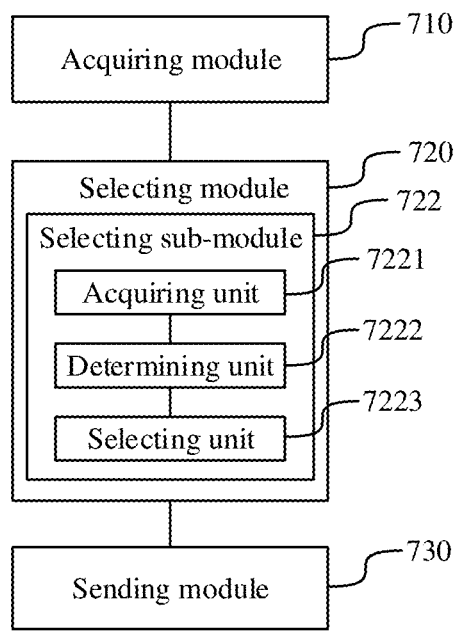
FIG. 9 is a schematic structural diagram of a device for presenting information according to an embodiment of the present disclosure.

Optionally, as shown in FIG. 9, the selecting sub-module 722 includes: an acquiring unit 7221, a determining unit 7222 and a selecting unit 7223.

The acquiring unit 7221 is configured to acquire a preset target number of presenting times and a remaining number of presenting times of each piece of presentation information for the video.

The determining unit 7222 is configured to determine a priority of each piece of presentation information for the video based on a ratio of the remaining number of presenting times to the preset target number of presenting times of the piece of presentation information.

The selecting unit 7223 is configured to select the piece of presentation information having the highest priority with the presentation information type having the greatest number of browsing times from the presentation information set corresponding to the information presentation time point as the to-be-presented information corresponding to the information presentation time point.

Figure 10:
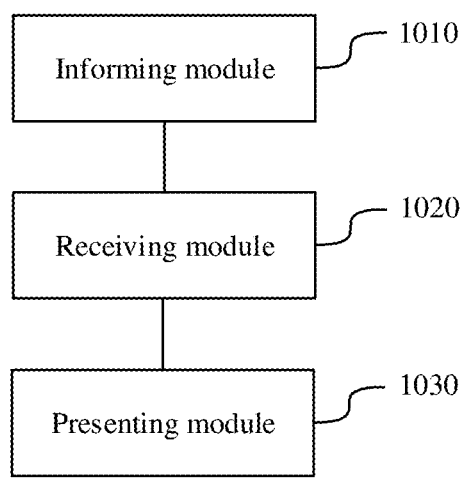
FIG. 10 is a schematic structural diagram of a device for presenting information according to an embodiment of the present disclosure.

Based on the same technical concept, the embodiment of the present disclosure also provides a terminal as shown in FIG. 10. The terminal includes: an informing module 1010, a receiving module 1020 and a presenting module 1030.

The informing module 1010 is configured to inform a server of a video to be played on a terminal.

The receiving module 1020 is configured to receive to-be-presented information corresponding to a preset information presentation time point in the video to be played sent from the server.

The presenting module 1030 is configured to play the video and display the to-be-presented information at the preset information presentation time point corresponding to the to-be-presented information.

Optionally, the receiving module is configured to receive the to-be-presented information corresponding to the preset information presentation time point in the video to be played and an associated location corresponding to the to-be-presented information sent from the server; and the presenting module is configured to play the video, and display the to-be-presented information at the information presentation time point corresponding to the to-be-presented information, and display an associated marker at the associated location in the video to represent association between the to-be-presented information and the associated location.

In the embodiments of the present disclosure, at least one preset information presentation time point in a video to be played and a pre-stored presentation information set associated with video content at the information presentation time point are acquired, the presentation information set corresponds to the information presentation time point in a one-to-one manner, to-be-presented information is selected from the presentation information set corresponding to the information presentation time point based on historical browsing information, to obtain the to-be-presented information corresponding to the information presentation time point, and the to-be-presented information corresponding to the information presentation time point is sent to a terminal, and the terminal displays the to-be-presented information at the information presentation time point corresponding to the to-be-presented information when the terminal play the video. In this way, when the video is played on the terminal, the presentation information presented to the user is selected based on the historical browsing information, hence the presentation information presented to the user relatively meets the requirements of the user, thereby improving the effectiveness of the presentation information.

It should be noted that, when a device for presenting information provided in the embodiments presents information, illustrations are made only based on the classification of the above each functional module. In practice, the foregoing functions may be achieved by different functional modules according to requirements, that is, an internal structure of the device is divided into different functional modules to complete all or a part of functions described above. In addition, a device for presenting information provided in the above embodiment and the embodiment of a method for presenting information have the same concept, and the detailed implementation process of the device can refer to the embodiments of the method for presenting information, which is be described here.

Figure 11:
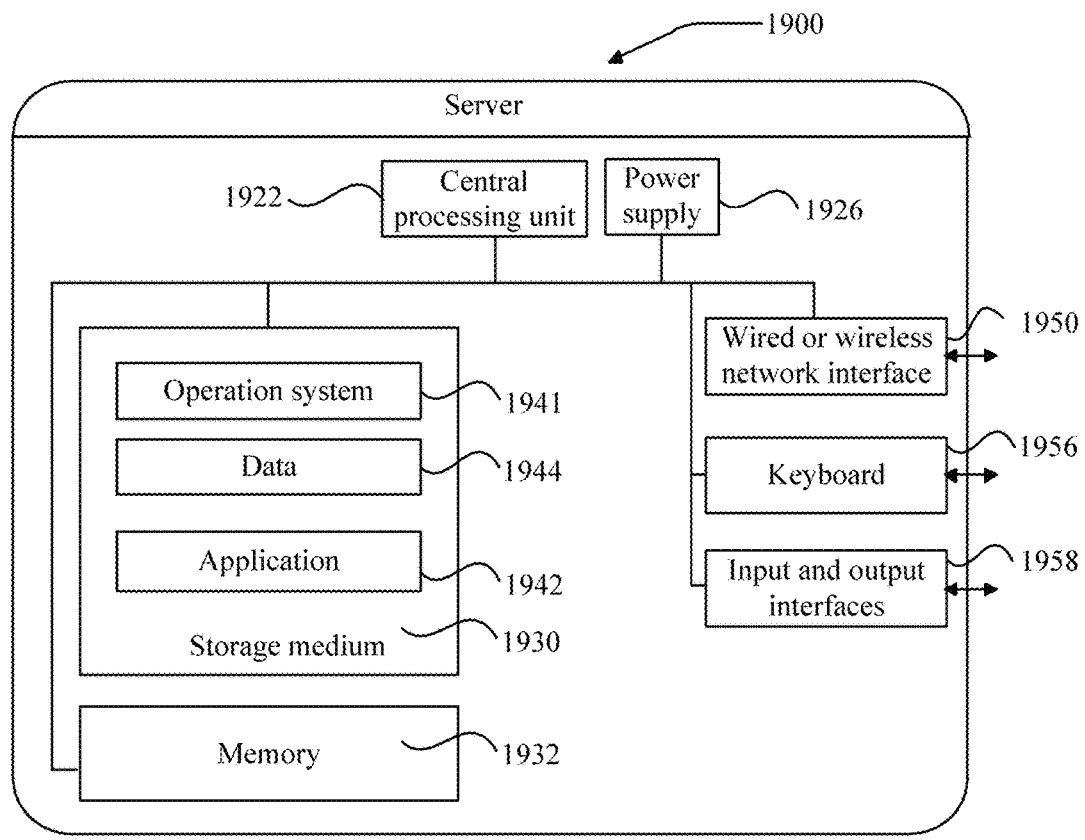
FIG. 11 is a schematic structural diagram of a server according to an embodiment of the present disclosure.

Referring to FIG. 11, which is a schematic structural diagram of a server involved in the embodiment of the present disclosure. The server is configured to execute a method for presenting information provided in the foregoing embodiments.

The server 1900 may have large difference due to different configurations or performance, and may include one or more central processing units (CPU) 1922 (one or more processors for example), a memory 1932, and one or more storage mediums 1930 (one or more mass devices for example) storing applications 1942 or data 1944. The memory 1932 and the storage medium 1930 may be a short-time storage device or a persistent storage device. A program stored on the storage medium 1930 may include one or more modules (not shown in FIG. 11), and each of the modules may include operations by a series of instructions in the server. Furthermore, the central processing unit 1922 may be set to communicate with the storage medium 1930 and execute a series of instruction operations in the storage medium 1930 on the server 1900.

The server 1900 may also include one or more power supplies 1926, one or more wired or wireless network interfaces 1950, one or more input and output interfaces 1958, one or more keyboards 1956, and/or one or more operation systems 1941, such as Windows Server™, Mac OS XTM, Unix™, Linux™, FreeBSD™ and so on.

The server 1900 may include a memory and one or more programs. The one or more programs are stored in the memory, and the server 1900 is configured to execute instructions included in the one or more programs by one or more processors to perform operations including:

acquiring at least one preset information presentation time point in a video to be played and a pre-stored presentation information set associated with video content at the information presentation time point, where the presentation information set corresponds to the information presentation time point in a one-to-one manner;

selecting to-be-presented information from the presentation information set corresponding to the information presentation time point based on historical browsing information, to obtain the to-be-presented information corresponding to the information presentation time point; and sending the to-be-presented information corresponding to the information presentation time point to a terminal.

Optionally, after obtaining the to-be-presented information corresponding to the information presentation time point, the operations further includes:

determining an associated location corresponding to the to-be-presented information corresponding to the information presentation time point in the video according to a pre-stored correspondence between presentation information for the video and an associated location in the video; and where sending the to-be-presented information corresponding to the information presentation time point to the terminal includes:

sending the to-be-presented information corresponding to the information presentation time point and the associated location corresponding to the to-be-presented information to the terminal.

Optionally, selecting the to-be-presented information from the presentation information set corresponding to the information presentation time point based on the historical browsing information to obtain the to-be-presented information corresponding to the information presentation time point includes:

selecting, based on historical browsing information and account attribute information of a current login account of the terminal, presentation information meeting a preset matching condition with the historical browsing information and the account attribute information from the presentation information set corresponding to the information presentation time point as the to-be-presented information corresponding to the information presentation time point.

Optionally, selecting the to-be-presented information from the presentation information set corresponding to the information presentation time point based on the historical browsing information to obtain the to-be-presented information corresponding to the information presentation time point includes:

determining the number of browsing times of each presentation information type based on the historical browsing information; and selecting presentation information with the presentation information type having the greatest number of browsing times from the presentation information set corresponding to the information presentation time point as the to-be-presented information corresponding to the information presentation time point.

Optionally, selecting the presentation information with the presentation information type having the greatest number of browsing times from the presentation information set corresponding to the information presentation time point as the to-be-presented information corresponding to the information presentation time point includes:

acquiring a preset target number of presenting times and a remaining number of presenting times of each piece of presentation information for the video;

determining a priority of each piece of presentation information for the video based on a ratio of the remaining number of presenting times to the preset target number of presenting times of the piece of presentation information; and selecting the piece of presentation information having the highest priority with the presentation information type having the greatest number of browsing times from the presentation information set corresponding to the information presentation time point as the to-be-presented information corresponding to the information presentation time point.

In the embodiments of the present disclosure, a preset information presentation time point in a video to be played and a pre-stored presentation information set associated with video content at the information presentation time point are acquired, the presentation information set corresponds to the information presentation time point in a one-to-one manner, to-be-presented information is selected from the presentation information set corresponding to the information presentation time point based on historical browsing information, to obtain the to-be-presented information corresponding to the information presentation time point, and the to-be-presented information corresponding to the information presentation time point is sent to a terminal. In this way, when the video is played on the terminal, the presentation information presented to the user is selected based on the historical browsing information, hence the presentation information presented to the user meets the requirements of the user, thereby improving the effectiveness of the presentation information.

Figure 12:
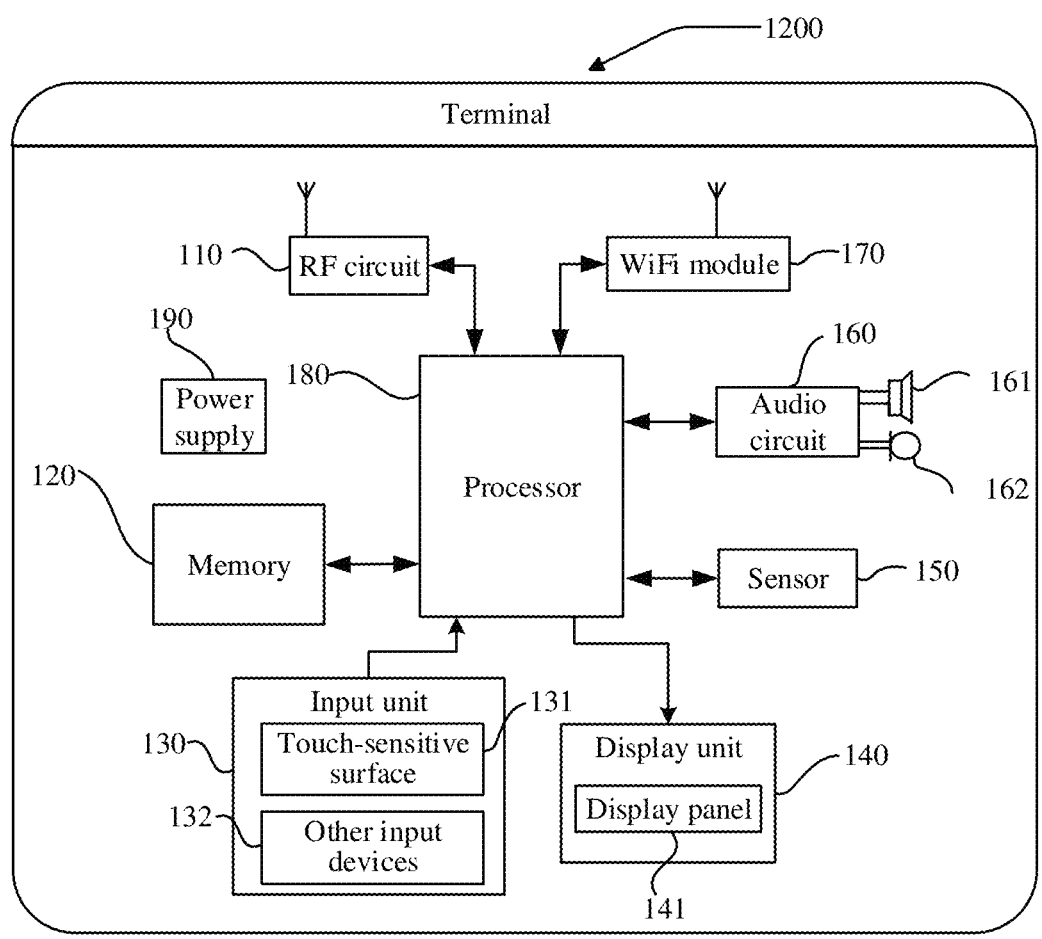
FIG. 12 is a schematic structural diagram of a terminal according to an embodiment of the present disclosure.

Referring to FIG. 12, which is a schematic structural diagram illustrating a terminal involved in an embodiment of the present disclosure, which may be used for implementing the methods provided in the above embodiments.

A terminal 1200 may include a radio frequency (RF) circuit 110, a memory 120 including one or more computer readable storage mediums, an input unit 130, a display unit 140, a sensor 150, an audio circuit 160, a WiFi module 170, a processor 180 including one or more processing cores and a power supply 190, etc. It can be understood by those skilled in the art that, the terminal should not be limited by the structure of the terminal shown in FIG. 12, the terminal may include more or less components than the terminal in the FIG. 12, or combinations of some components, or different arrangements of components.

The RF circuit 110 may be configured to receive and send a signal during a process of receiving and sending information or during a call, in particular to receive downlink information from a base station and send the downlink information to one or more processors 180 for processing, and to send uplink data to the base station. Generally, the RF circuit 110 includes but is not limited to an antenna, at least one amplifier, a tuner, one or more oscillators, a subscriber identity module (SIM) card, a transceiver, a coupler, a low noise amplifier (LNA) and a duplexer, etc. Additionally, the RF circuit 110 can also communicate with a network or other devices through wireless communications. The wireless communications may be performed by using any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), Email and Short Messaging Service (SMS), etc.

The memory 120 may be configured to store software programs and modules. By running software programs and modules stored in the memory 120, the processor 180 can execute all kinds of functional applications and data processing. The memory 120 may mainly include a program storage area and a data storage area. The program storage area can store an operating system and an application required by at least one function (such as an audio playing function, an image displaying function), etc.; while the data storage area can store data (such as audio data, a phonebook and so on) created according to the utilization of the terminal 1200. Moreover, the memory 120 may include a high-speed random access memory or a non-volatile memory as well, for example, at least one disk memories, a flash memory or other volatile solid-state memory. Accordingly, the memory 120 may also include a memory controller to provide access to the memory 120 by the processor 180 and the input unit 130.

The input unit 130 may be configured to receive an inputted number or character information, and generate signal input of keyboard, mouse, operating lever, optical or trackball which are relevant to user settings and function control. Specifically, the input unit 130 may include a touch-sensitive surface 131 and other input devices 132. The touch-sensitive surface 131 is also called as a touch screen or a touchpad, for collecting touch operations thereon or nearby by a user (such like operations on the touch-sensitive surface 131 or near the touch-sensitive surface 131 by the user through any suitable objects or accessories such as fingers, a touch pen) and driving a corresponding connecting device based on a preset form. Optionally, the touch-sensitive surface 131 may include a touch detection device and a touch controller; the touch detection device is configured to detect a touch position of the user and a signal created by the touch operation, and send the signal to the touch controller; and the touch controller is configured to receive touch information from the touch detection device and transform it to a touch spot coordinate, send the touch spot coordinate to the processor 180, and receive a command sent from the processor 180 and execute the command. Additionally, a touch-sensitive surface 131 may be achieved by various types of touch-sensitive surface, such as a resistance touch-sensitive surface, a capacitance touch-sensitive surface, infrared rays touch-sensitive surface and surface acoustic waves touch-sensitive surface. The input unit 130 may also include other input devices 132 in addition to the touch-sensitive surface 131. Specifically, other input devices 132 may include but not limited to one or more of a physical keyboard, a function key (such as a volume control key, an on/off key), a trackball, a mouse and an operating lever, etc.

The display unit 140 may be configured to display information inputted by the user, or information provided to the user and various graphic user interfaces of the terminal 1200. The graphic user interfaces may include a graph, a text, an icon, a video and any combinations of them. The display unit 140 may include a display panel 141. Optionally, the display panel 141 may be configured with a liquid crystal display (LCD), an organic light-emitting diode (OLED) and so on. Furthermore, the touch-sensitive surface 131 may cover the display panel 141. When the touch-sensitive surface 131 detects a touch operation on the touch-sensitive surface 131 or near the touch-sensitive surface 131, the touch-sensitive surface 131 sends the touch operation to the processor 180 to determine a type of the touch event, then the processor 180 provides a corresponding vision output on the display panel 141 according to the type of the touch event. Although in FIG. 12, the touch-sensitive surface 131 and the display panel 141 are two independent components to realize input and output functions, however, in some embodiments, the touch-sensitive surface 131 and the display panel 141 may be integrated to realize input and output functions.

The terminal 1200 may also include at least one sensor 150, such as an optical sensor, a motion sensor and other sensors. Specifically, the optical sensor may include an ambient light sensor and a proximity sensor. The ambient light sensor can adjust the brightness of the display panel 141 according to ambient light, while the proximity sensor can shut the display panel 141 and/or backlight when the terminal 1200 moves to the ear. As a kind of motion sensor, a gravity acceleration sensor can detect a magnitude of the acceleration in any direction (three axis directions generally). The gravity acceleration sensor can detect a magnitude and direction of gravity when gravity acceleration sensor is static, and can be used in application for identifying a gesture of a mobile phone (such as a landscape/portrait mode switching, a relevant game and magnetometer posture calibration), vibration identifying relevant functions (such as a pedometer and a knock) and so on. For other sensors which may be provided in the terminal 1200, such as a gyroscope, barometer, hygrometer, thermometer, infrared sensor, detailed descriptions are not made here for simplicity.

The audio circuit 160, a loudspeaker 161 and a microphone 162 can provide an audio interface between a user and the terminal 1200. The audio circuit 160 can transmit an electric signal, which is transformed form received audio data, to the loudspeaker 161, and the loudspeaker 161 transforms the electric signal to a sound signal and output it. On the other hand, the microphone 162 transforms a collected sound signal to an electric signal, the electric signal is received and transformed to audio data by the audio circuit 160; the audio data is outputted to the processor 180 and be processed by the processor 180; and finally the processed audio data is sent to another terminal through the RF circuit 110, or the audio data is outputted to the memory 120 for further processing. The audio circuit 160 may also include an earplug jack for providing communication between a peripheral headphone with the terminal 1200.

WiFi uses a short distance wireless transmission technology. The terminal 1200 can help the user receive and send an email, browse a website and access streaming media, etc. through the WiFi module 170, the WiFi module 170 provides wireless broadband internet access for the user. Although the WiFi module 170 is shown in FIG. 12, it can be understood that, the WiFi module 170 is not a necessary component of the terminal 1200 and it can be omitted as required without changing the nature of the present disclosure.

The processor 180 is a control center of the terminal 1200, which is configured to connect all parts of a whole mobile phone by all kinds of interfaces and circuits, and to execute various functions of the terminal 1200 and process data by running or executing software programs and/or modules stored in the memory 120 and invoking data stored in the memory 120, to perform an overall monitoring on the mobile phone. Optionally, the processor 180 may include one or more processing cores. Preferably, an application processor and a modulation-demodulation processor may be integrated into the processor 180; the application processor mainly processes an operating system, a user interface, an application and so on; while the modulation-demodulation processor mainly processes a wireless communication. It can be understood that, the modulation-demodulation processor may not be integrated into the processor 180.

The terminal 1200 further includes the power supply 190 (a battery for example) to power to all components. Preferably, the power supply may logically connect to the processor 180 through a power management system to realize functions of charge management, discharge management and power management through the power management system. The power supply 190 may also include one or more DC or AC power supplies, a recharging system, a power failure detection circuit, a power converter or inverter, a power status indicator and any other components.

Although not shown in FIG. 12, the terminal 1200 may also include a camera and a bluetooth module, etc., which are not described here for simplicity. Specifically, in this embodiment, a display unit of the terminal 1200 is a touch-screen display. The terminal 1200 further includes a memory and one or more programs, the one or more programs are stored in the memory, and the terminal 1200 is configured to execute instructions included in the one or more programs by one or more processors to perform operations including:

informing a server of a video to be played on a terminal;

receiving to-be-presented information corresponding to a preset information presentation time point in the video to be played sent from the server; and playing the video, and displaying the to-be-presented information at the information presentation time point corresponding to the to-be-presented information.

Optionally, receiving the to-be-presented information corresponding to the preset information presentation time point in the video to be played sent from the server includes:

receiving the to-be-presented information corresponding to the preset information presentation time point in the video to be played and an associated location corresponding to the to-be-presented information sent from the server; and where playing the video, and displaying the to-be-presented information at the preset information presentation time point corresponding to the to-be-presented information includes:

playing the video, and displaying the to-be-presented information at the preset information presentation time point corresponding to the to-be-presented information, and displaying an associated marker at the associated location in the video to represent association between the to-be-presented information and the associated location.

In the embodiments of the present disclosure, at least one preset information presentation time point in a video to be played and a pre-stored presentation information set associated with video content at the information presentation time point are acquired, the presentation information set corresponds to the information presentation time point in a one-to-one manner, to-be-presented information is selected from the presentation information set corresponding to the information presentation time point based on historical browsing information, to obtain the to-be-presented information corresponding to the information presentation time point, and the to-be-presented information corresponding to the information presentation time point is sent to a terminal. In this way, when the video is played on the terminal, the presentation information presented to the user is selected based on the historical browsing information, hence the presentation information presented to the user meets the requirements of the user, thereby improving the effectiveness of the presentation information.

It should be understood by those skilled in the art that all or a part of steps for implementing the above embodiments may be completed by a hardware, and also may be completed by a related hardware which is instructed by a program. And the program may be stored in a computer readable storage medium such as a read only memory, a magnetic disk or an optical disk.

The described embodiments are merely preferred embodiments of the disclosure. The embodiments are not intended to limit the disclosure. Any change, equivalent replacement, modification made within the spirit and principle of the disclosure should fall in the scope of protection of the disclosure.

The invention claimed is:

1. A method for presenting information, the method comprising:
   acquiring at least one preset information presentation time point in a video to be played and a pre-stored presentation information set associated with video content at the at least one preset information presentation time point, wherein the pre-stored presentation information set corresponds to the at least one preset information presentation time point in a one-to-one manner;
   determining a number of browsing times of each of presentation information types, based on historical browsing information;
   selecting, from the pre-stored presentation information set, presentation information with one of the presentation information types having a greatest number of browsing times among the determined number of browsing times of each of the presentation information types, as to-be-presented information corresponding to the acquired at least one preset information presentation time point;
   acquiring a preset target number of presenting times and a remaining number of presenting times of each of pieces of presentation information for the video in the pre-stored presentation information set;

determining a priority of each of the pieces of the presentation information for the video, based on a ratio of the acquired remaining number of presenting times to the acquired preset target number of presenting times of a respective one of the pieces of the presentation information for the video, wherein the priority is higher as the ratio is greater, and the priority is lower as the ratio is lesser;

selecting, from the pre-stored presentation information set, one of the pieces of the presentation information for the video having a highest priority, further as the to-be-presented information corresponding to the acquired at least one preset information presentation time point;

sending the selected to-be-presented information corresponding to the acquired at least one preset information presentation time point, to a terminal; and controlling the terminal to display the selected to-be-presented information, along with the video, and along with a marker connecting the displayed to-be-presented information to a relevant commodity in the displayed video, wherein the method is performed by a processor.

2. The method according to claim 1, further comprising, after the to-be-presented information corresponding to the acquired at least one preset information presentation time point is selected, determining an associated location corresponding to the selected to-be-presented information, based on pre-stored correspondences between the pieces of the presentation information for the video and associated locations in the video, wherein the sending the selected to-be-presented information comprises sending the selected to-be-presented information corresponding to the acquired at least one preset information presentation time point, along with the determined associated location corresponding to the selected to-be-presented information, to the terminal.

3. The method according to claim 1, further comprising selecting, based on the historical browsing information and account attribute information of a current login account of the terminal, presentation information meeting a preset matching condition with the historical browsing information and the account attribute information, from the presentation information set, further as the to-be-presented information corresponding to the acquired at least one preset information presentation time point.

4. The method according to claim 2, further comprising selecting, based on the historical browsing information and account attribute information of a current login account of the terminal, presentation information meeting a preset matching condition with the historical browsing information and the account attribute information, from the presentation information set, further as the to-be-presented information corresponding to the acquired at least one preset information presentation time point.

5. A server, comprising a processor and a memory for storing program instructions, wherein the processor is configured to execute the program instructions to:

acquire at least one preset information presentation time point in a video to be played and a pre-stored presentation information set associated with video content at the at least one preset information presentation time point, wherein the pre-stored presentation information set corresponds to the at least one preset information presentation time point in a one-to-one manner;

determine a number of browsing times of each of presentation information types, based on historical browsing information;

select, from the pre-stored presentation information set, presentation information with one of the presentation information types having a greatest number of browsing times among the determined number of browsing times of each of the presentation information types, as to-be-presented information corresponding to the acquired at least one preset information presentation time point;

acquire a preset target number of presenting times and a remaining number of presenting times of each of pieces of presentation information for the video in the pre-stored presentation information set;

determine a priority of each of the pieces of the presentation information for the video, based on a ratio of the acquired remaining number of presenting times to the acquired preset target number of presenting times of a respective one of the pieces of the presentation information for the video, wherein the priority is higher as the ratio is greater, and the priority is lower as the ratio is lesser;

select, from the pre-stored presentation information set, one of the pieces of the presentation information for the video having a highest priority, further as the to-be-presented information corresponding to the acquired at least one preset information presentation time point;

send the selected to-be-presented information corresponding to the acquired at least one preset information presentation time point, to a terminal; and control the terminal to display the selected to-be-presented information, along with the video, and along with a marker connecting the displayed to-be-presented information to a relevant commodity in the displayed video.

6. The server according to claim 5, wherein the processor is further configured to execute the program instructions to:

after the to-be-presented information corresponding to the acquired at least one preset information presentation time point is selected, determine an associated location corresponding to the selected to-be-presented information, based on pre-stored correspondences between the pieces of the presentation information for the video and associated locations in the video; and send the selected to-be-presented information corresponding to the acquired at least one preset information presentation time point, along with the determined associated location corresponding to the selected to-be-presented information, to the terminal.

7. The server according to claim 6, wherein the processor is further configured to execute the program instructions to select, based on the historical browsing information and account attribute information of a current login account of the terminal, presentation information meeting a preset matching condition with the historical browsing information and the account attribute information, from the presentation information set, further as the to-be-presented information corresponding to the acquired at least one preset information presentation time point.

8. The server according to claim 5, wherein the processor is further configured to execute the program instructions to select, based on the historical browsing information and account attribute information of a current login account of the terminal, presentation information meeting a preset matching condition with the historical browsing information and the account attribute information, from the presentation information set, further as the to-be-presented information corresponding to the acquired at least one preset information presentation time point.

\* \* \* \* \*